United States Patent [19]
Pierson, Jr. et al.

[11] 3,722,906
[45] Mar. 27, 1973

[54] STROLLER BUMPER

[75] Inventors: Raymond G. Pierson, Jr., Bedford; Charles L. Voytko, Johnston, both of Pa.

[73] Assignee: Hestrom Company, Bedford, Pa.

[22] Filed: Mar. 15, 1971

[21] Appl. No.: 124,053

[52] U.S. Cl............................280/47.4, 293/73
[51] Int. Cl. ....................................B62b 7/00
[58] Field of Search ......280/47.38, 36 B, 41 A, 47.4; 293/73

[56] References Cited

UNITED STATES PATENTS

| 3,019,028 | 1/1962 | Hedstrom | 280/36 B |
| 2,593,962 | 4/1952 | Barker | 280/47.4 |

*Primary Examiner*—Kenneth H. Betts
*Assistant Examiner*—Robert R. Song
*Attorney*—Cesari and McKenna

[57] ABSTRACT

A collapsible stroller has a seat in which the child sits and a footrest spaced below the seat on which the child may rest his feet and legs. The footrest projects beyond the front of the carriage and it is adjustable in the usual way between upper and lower horizontal positions. A plastic bumper composed of a shell and strap is clamped onto the front of the footrest and projects beyond the carriage per se. The shell has a depending skirt and rigidifying ribs which abut the front edge of the footrest so that the bumper as a whole is able to withstand impacts when the footrest is in either of its operative positions.

4 Claims, 3 Drawing Figures

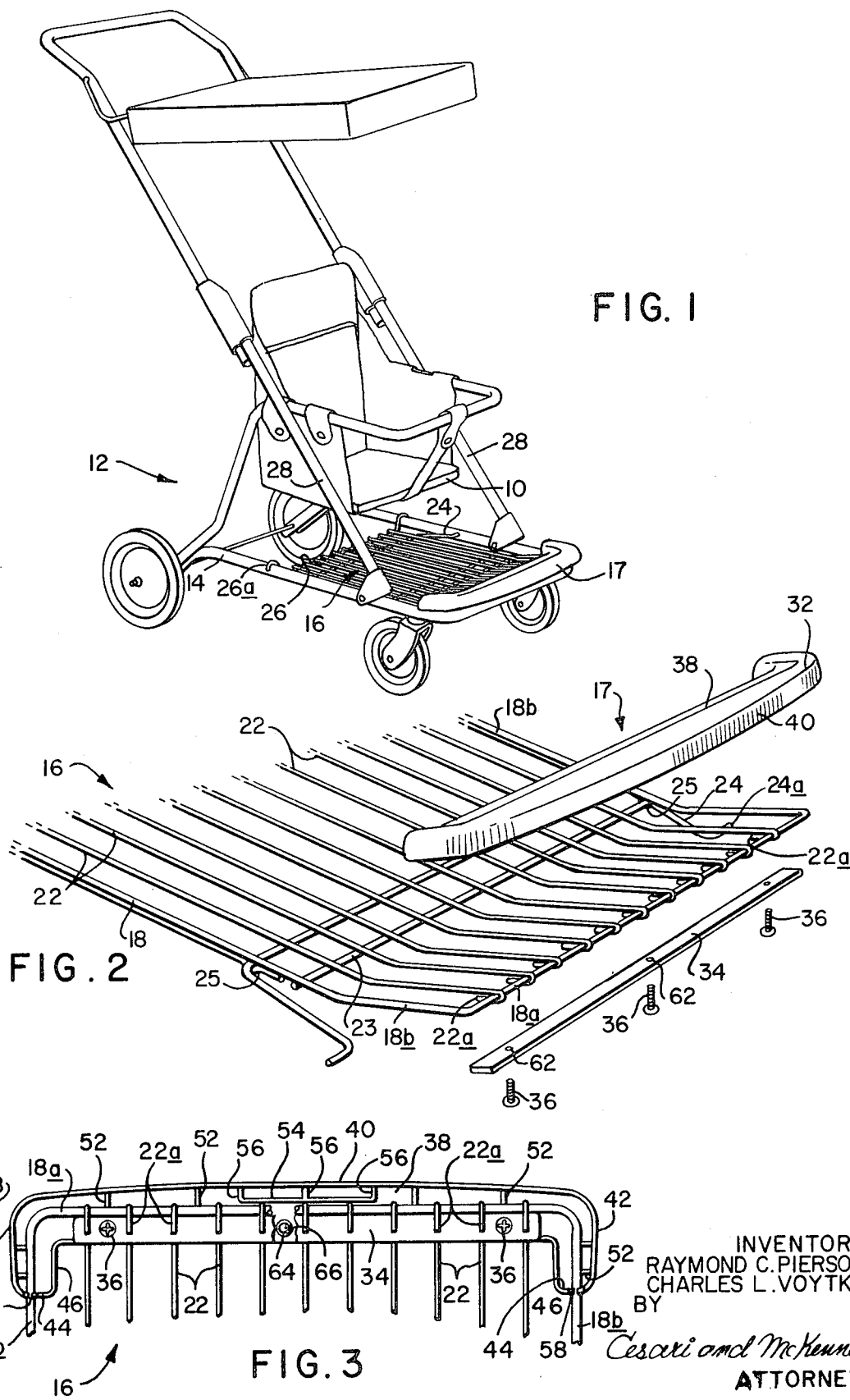

STROLLER BUMPER

BACKGROUND OF THE INVENTION

This invention relates to baby carriages, strollers, shoppers and other similar items of juvenile furniture. It relates more particularly to a stroller bumper which is rugged and durable, yet which is easily replaceable in the event it becomes damaged in use.

Bumpers of one form or another have been used for many years on strollers and carriages. In the case of the foldable strollers with which we are concerned here, these bumpers invariably comprise a wire bail secured to the front of the running gear so that it projects forwardly and extends parallel to the front of the stroller. A generally cylindrical plastic or rubber tube is slid over the bail so as to form a resilient sleeve which is able to absorb impacts to some extent and which also protects surfaces struck by the stroller.

While this conventional bumper construction is quite adequate, it is relatively expensive in terms of materials and labor costs. Also, it is relatively difficult to replace the bumper if it becomes damaged. Moreover, it does not protect the stroller when it is functioning as a carriage in which the baby can recline.

SUMMARY OF THE INVENTION

Accordingly, this invention aims to provide a stroller, carriage or the like having a protective bumper which is relatively easy and inexpensive to make.

Another object of the invention is to provide a stroller bumper which can easily be installed initially and replaced quite quickly without any special tools or equipment.

Another object of the invention is to provide a stroller bumper which is rugged and durable and, as such, can withstand sudden impacts without cracking or tearing.

Still another object is to provide a bumper for a stroller which is adjusted so that the baby can lie down.

Other objects will in part be obvious and will in part appear hereinafter.

The invention accordingly comprises the features of construction, combination of elements and arrangements of parts which will be exemplified in the construction hereinafter set forth and the scope of the invention will be indicated in the claims.

In general, the subject stroller has the usual running gear which supports a seat for the child. A grill work platform is adjustably positioned below the seat to support the baby's feet. The front of the footrest projects out somewhat in front of the running gear. Usually, also, the footrest is adjustable between a lower position wherein it is substantially below the plane of the seat and an upper position wherein it lies almost in the same plane as the seat and serves as an extension thereof when the child is lying down in the stroller.

Instead of mounting the bumper on a separate bail attached to the running gear, or mounting it directly onto the running gear as is done conventionally, the subject bumper is secured to the projecting forward edge of the footrest. Thus, since the footrest is the forwardmost part of the stroller, the bumper is operable in both of the operative positions of the footrest.

The bumper per se is composed of two sections, to wit: an upper shell and a lower strap. The shell engages over the top of the front edge margin of the footrest and the strap engages under the same footrest margin. The two sections are clamped together on opposite sides of the footrest. The shell has a depending skirt spaced in front of the footrest which hangs down below the footrest. Also, a number of depending rigidifying ribs are formed in the underside of the shell. These ribs are oriented perpendicular to the skirt and extend between the skirt and the edge of the footrest so that when the bumper is in place, the shell is able to withstand impacts without cracking or breaking. Yet, the bumper can be installed easily by relatively unskilled personnel using only a conventional screwdriver. Also, should the need arise, the bumper can be replaced by the average parent.

BRIEF DESCRIPTION OF THE DRAWING

For a fuller understanding of the nature and objects of the invention, reference should be had to the following detailed description taken in connection with the accompanying drawing, in which:

FIG. 1 is a perspective view of a stroller having a bumper and made in accordance with this invention;

FIG. 2 is a fragmentary exploded perspective view on a larger scale showing the footrest and bumper components in greater detail; and FIG. 3 is a fragmentary bottom view with parts cut away showing the bumper installed on the footrest.

DESCRIPTION OF THE PREFERRED EMBODIMENT

Turning now to FIG. 1 of the drawing, the present stroller has the usual seat 10 supported by a conventional foldable running gear shown generally at 12. The running gear includes a horizontal, generally U-shaped base frame 14. Also, a grill-like footrest platform 16 is pivotally mounted on frame 14.

Footrest 16 has a lower operative position shown in FIG. 1 wherein it lies directly below seat 10 generally in the plane of frame 14. In this position, the forward edge of the footrest projects forwardly of frame 14 to some extent. Footrest 16 is also swingable upwardly and forwardly to an upward position wherein it lies horizontally generally in the plane of seat 10. When the footrest is in this upper position, it projects an appreciable distance in front of base frame 14.

A resilient bumper 17 is secured to the forward end of footrest 16 so that it projects forwardly of base frame 14 and is in position to absorb impacts when the stroller is pushed into an obstruction. Also, it protects the obstructing surface from becoming dented or scraped by the stroller. It is important to note that the bumper protects the stroller not only when the footrest 16 is in its lower position, but also when it is raised to its upper position wherein it extends out in fromt of the running gear 12.

Turning now to FIG. 2, footrest 16 comprises a generally U-shaped bail 18 having a front edge or web 18a and a pair of side legs 18b. A number of spaced-apart wire stringers 22 are arranged parallel to legs 18b. The forward ends 22a of these stringers are bent around web 18a and are preferably spot-welded to web 18a as well. The stringers 22 are held in position by a transverse wire 23 positioned about a third of the way back from web 18a and spot-welded to the undersides of the stringers.

A generally U-shaped bail 24 is hinged at 25 to the legs 18b at the opposite sides of the footrest 16. The ends 24a of bail 24 are bent out sideways and are arranged to engage in openings in base frame 14. A similar bail is provided near the rear end of footrest 16 as shown in FIG. 1. The ends of that bail are also pivoted in openings provided in base frame 14. Finally, the rear ends of the stringers 22 are held in position by a wire 26 which is arranged transversely to the stringers and spot-welded to their undersides. Wire 26 has a pair of ears 26a at its opposite ends which overhang frame 14 to maintain the footrest in its lower horizontal position shown in FIG. 1.

The footrest can be lifted up and swung forward on its hinges to an upper position wherein it lies essentially in the same plane as the seat 10. It is held in this upper position by the engagement of the forward bail 24 against the front of base frame 14 and also by the engagement of ears 26a against the upwardly/rearwardly inclining seat-supporting frames 28.

Referring now to FIGS. 2 and 3, bumper 17 is comprised of an upper shell-like section 32 and a lower strap-like section 34. These sections are placed against the top and bottom, respectively, of the footrest 16 near the forward edge thereof and secured together by screws 36 so that the footrest is clamped between them as best seen in FIG. 3.

Section 17 is formed of suitable relatively resilient, impact-resistant plastic such as high density polyethylene. It has a generally flat top wall 38 and a depending skirt 40 which extends all around the front of section 17. Skirt 40 continues around the sides of top wall 38 as a pair of skirts 42. Skirts 42 extend back a relatively short distance and then turn inwardly toward one another at midportions 44,44 and then double back at portions 46,46 following the rear edge of top wall 38. There is no skirt along most of the rear edge of top wall 38 in order that the underside of wall 38 of section 32 can seat flush against the top of stringers 22, with the skirts 40,42,44 and 46 extending below the footrest.

As best seen in FIG. 3, a number of depending ribs 52 are spaced along skirts 40 and 42. Ribs 52 extend away from the skirt for a distance depending upon the exact contour of section 17 so when that section is fitted onto the footrest 16 as shown in FIG. 3, the ends of the ribs butt against the outside of the bail web 18a and legs 18b.

Also, a depending box frame is formed at the midportion of section 17. The box frame is comprised of a depending rib 54 extending parallel to skirt 40, the ends and mid-portion of which are connected to skirt 40 by ribs 56, extending parallel to ribs 52.

When the bumper section 17 is placed over the front of footrest 16, the ribs 52, 54 and 56 abut the bail web 18a and legs 18b to properly center the section on the footrest. It should be noted that the skirt midportions 44 are slitted at 58 to accommodate the legs 18b of the bail.

When the bumper section 17 is in place, the lower strap-like section 34 is positioned transversely against the undersides of the stringers 22 and slid in between the stringers and their in-turned ends 22a. This enables the section 34 to seat flush against the underside of the footrest behind the web 18a of the footrest bail 18. Section 34 has three openings 62 for receiving the screws 36. These screws extend up between the stringers 22 in the footrest and are turned down into threaded openings 64 formed in pedestals 66 extending from the underside of wall 38 of section 17.

When the screws 36 are tightened, the bumper cannot be pulled away from the footrest. This is because, as noted previously, the strap section 34 engages behind the bail 18a and under stringer ends 22a. Also, of course, the various ribs 52 etc. prevent rearward or sideways movement of the bumper. These ribs, and especially the ones near the midportion of the bumper, also rigidify the bumper and help it to withstand even head-on impacts without cracking or buckling. Yet, the present bumper accounts for some cost saving in stroller manufacture. This is because the bumper is mounted directly onto the footrest rather than on a separate bail which must be provided and attached to the front of base frame 14. Also, the present construction facilitates replacement of the bumper in the event that becomes necessary. The average parent can remove and replace the bumper simply by removing the screws 36 to remove the damaged bumper. Then he can install the new one by replacing the same screws. Because of the aforementioned ribs, the bumper is automatically positioned properly on the footrest.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described.

We claim:

1. In a child's stroller, carriage or the like having a wheeled running gear, a seat supported by the running gear and a footrest, the improvement comprising a footrest portion which protrudes beyond the foremost portion of the running gear and a relatively resilient bumper engaged over the footrest portion, said bumper being composed of an upper section having a top wall which engages the top of the footrest portion at the forward edge thereof and a depending skirt integral with the top wall which extends down below the footrest portion, wherein the bumper is composed also of a lower section and means for clamping together the two bumper sections against the top and bottom of the footrest portion, respectively.

2. The stroller, carriage or the like defined in claim 1 wherein the bumper is constructed of a relatively impact-resistant plastic and extends somewhat forwardly of the footrest portion.

3. The stroller, carriage or the like defined in claim 1 wherein the upper section has a plurality of ribs integral with the top wall and skirt of the upper section and extending between the skirt and the front edge of the footrest portion so as to reinforce the upper section against impacts.

4. The stroller, carriage or the like defined in claim 3 wherein the footrest is composed of a transverse wire at the front thereof and a plurality of parallel, spaced-apart stringers extending perpendicular to the wire and having their forward ends bent around the wire and the lower bumper section is positioned flush against the under-sides of the stringers and against the wire so that when the two bumper sections are secured in place, the bumper cannot be slid frontwards from the footrest.

* * * * *